United States Patent
Xu et al.

(10) Patent No.: US 10,220,710 B2
(45) Date of Patent: Mar. 5, 2019

(54) FUZZY LOGIC BASED SLIDING MODE CONTROL OF VARIABLE VOLTAGE CONVERTER

(71) Applicant: FORD GLOBAL TECHNOLOGIES, LLC, Dearborn, MI (US)

(72) Inventors: Wei Xu, Canton, MI (US); Fazal Urrahman Syed, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 490 days.

(21) Appl. No.: 14/884,109

(22) Filed: Oct. 15, 2015

(65) Prior Publication Data

US 2017/0106756 A1 Apr. 20, 2017

(51) Int. Cl.
- *H02M 1/00* (2006.01)
- *H02M 3/158* (2006.01)
- *B60L 11/18* (2006.01)
- *H02M 3/156* (2006.01)
- *B60L 15/00* (2006.01)

(52) U.S. Cl.
CPC ............ *B60L 11/18* (2013.01); *B60L 15/007* (2013.01); *H02M 3/156* (2013.01); *H02M 3/158* (2013.01); *B60L 2210/10* (2013.01); *B60L 2240/526* (2013.01); *B60L 2240/527* (2013.01); *B60L 2240/529* (2013.01); *H02M 2001/0012* (2013.01)

(58) Field of Classification Search
CPC ... B60L 2210/14; H02M 3/156; H02M 3/158; H02M 3/1582; H02M 2001/0012; H02M 3/157; Y02T 10/7225
See application file for complete search history.

(56) References Cited

U.S. PATENT DOCUMENTS

| | | | |
|---|---|---|---|
| 5,790,756 A | 8/1998 | Peters et al. | |
| 6,242,873 B1 | 6/2001 | Drozdz et al. | |
| 7,545,130 B2 * | 6/2009 | Latham | G05B 11/28 323/283 |
| 7,832,511 B2 | 11/2010 | Syed et al. | |
| 2009/0267580 A1* | 10/2009 | Derksen | H02M 3/157 323/282 |
| 2014/0067183 A1 | 3/2014 | Sisk | |

OTHER PUBLICATIONS

Mattavelli, Paolo, et al. "General-purpose fuzzy controller for dc/dc converters." Applied Power Electronics Conference and Exposition, 1995. APEC'95. Conference Proceedings 1995., Tenth Annual. vol. 2. IEEE, 1995.*

(Continued)

*Primary Examiner* — Ryan Johnson
(74) *Attorney, Agent, or Firm* — David Kelley; Brooks Kushman P.C.

(57) ABSTRACT

A DC-DC converter for a vehicle includes a controller programmed to, in response to changes in an output voltage of the converter, adjust a control signal that controls an output voltage of the DC-DC converter to drive a ratio of a first error between a reference current and a current through the inductor to a second error between a voltage reference and the output voltage to a predetermined value.

17 Claims, 4 Drawing Sheets

(56) References Cited

OTHER PUBLICATIONS

Tan, Siew-Chong, et al. "A fast-response sliding-mode controller for boost-type converters with a wide range of operating conditions." IEEE Transactions on Industrial Electronics 54.6 (2007): 3276-3286.*
Guo, Liping, John Y. Hung, and R. M. Nelms. "Comparative evaluation of sliding mode fuzzy controller and PID controller for a boost converter." Electric Power Systems Research 81.1 (2011): 99-106.*
Wai, Rong-Jong, You-Wei Lin, and Li-Chung Shih. "Design of adaptive fuzzy-neural-network control for DC-DC boost converter." Neural Networks (IJCNN), The 2012 International Joint Conference on. IEEE, 2012.*
Tan, Siew-Chong, Yuk-Ming Lai, and K. Tse Chi. "General design issues of sliding-mode controllers in DC-DC converters." IEEE Transactions on Industrial Electronics 55.3 (2008): 1160-1174.*
Nguyen, Vietson M., and C. Q. Lee. "Indirect implementations of sliding-mode control law in buck-type converters." Applied Power Electronics Conference and Exposition, 1996. APEC'96. Conference Proceedings 1996., Eleventh Annual. vol. 1. IEEE, 1996.*

* cited by examiner

FUZZY LOGIC BASED SLIDING MODE CONTROL OF VARIABLE VOLTAGE CONVERTER

TECHNICAL FIELD

This application is generally related to controlling a variable voltage converter.

BACKGROUND

Electrified vehicles include hybrid electric vehicles (HEV) and battery electric vehicles (BEV). Electrified vehicles include a traction battery to store energy to be used for propulsion and other purposes. The traction battery is configured to operate in a particular voltage range. However, improved performance of electric machines may be achieved by operating in a different voltage range, typically at higher voltages than the traction battery. Many electrified vehicles include a variable voltage converter to convert the voltage of the traction battery to a voltage level desired by the electric machines.

SUMMARY

In some configurations, a vehicle includes a DC-DC converter including an inductor and having an output voltage controlled by a control signal. The vehicle also includes a controller programmed to, in response to changes in the output voltage, adjust the control signal to drive a ratio of a first difference between a reference current and a current through the inductor to a second difference between a voltage reference and the output voltage to a predetermined value. Other configurations may include corresponding computer systems, apparatus, and computer programs recorded on one or more computer storage devices, each configured to perform the actions of the methods.

Some configurations may include one or more of the following features. The vehicle in which the controller is programmed to adjust the control signal based on a normal distance from a present operating point defined by the first difference and the second difference to a sliding surface defined by the predetermined value. The vehicle in which the predetermined value defines a dynamic response of an error in the output voltage. The vehicle in which the controller is further programmed to adjust the control signal based on a gain schedule having the normal distance as input. The vehicle in which the controller is further programmed to adjust the control signal based on fuzzy control rules having the normal distance as input. The vehicle in which the controller is further programmed to drive an adjustment in the control signal to zero. The vehicle in which the reference current is a filtered version of the current through the inductor. Implementation of the described configurations may include hardware, a method or process, or computer software on a computer-accessible medium.

In some configurations, a DC-DC converter includes an inductor. The DC-DC converter also includes at least one switching device. The DC-DC converter also includes a controller programmed to, in response to a ratio of a first difference between a reference current and a current through the inductor to a second difference between a voltage reference and an output voltage being different than a predetermined value, adjust a duty cycle of the at least one switching device to achieve the predetermined value. Other configurations may include corresponding computer systems, apparatus, and computer programs recorded on one or more computer storage devices, each configured to perform the actions of the methods.

Some configurations may include one or more of the following features. The DC-DC converter in which the controller is programmed to adjust the duty cycle based on a normal distance from a present operating point defined by the first difference and the second difference to a sliding surface defined by the predetermined value. The DC-DC converter in which the controller is further programmed to adjust the duty cycle based on a gain schedule having the normal distance as input. The DC-DC converter in which the controller is further programmed to adjust the duty cycle based on fuzzy control rules having the normal distance as input. The DC-DC converter in which the reference current is a low-pass filtered version of the current through the inductor. Implementation of the described configurations may include hardware, a method or process, or computer software on a computer-accessible medium.

In some configurations, a method for controlling a DC-DC converter includes changing, by a controller, a control signal for the DC-DC converter to achieve a predetermined value for a ratio of a first difference between a reference current and a current through an inductor to a second difference between a voltage reference and an output voltage. The method further includes converting, by the DC-DC converter, an input voltage to the output voltage according to the control signal. Other configurations may include corresponding computer systems, apparatus, and computer programs recorded on one or more computer storage devices, each configured to perform the actions of the methods.

Some configurations may include one or more of the following features. The method in which the control signal is a duty cycle for a switching device of the DC-DC converter. The method may include filtering, by the controller, the current through the inductor to generate the reference current. The method may include accumulating, by the controller, changes in the control signal over a plurality of execution intervals. The method may include outputting, by the controller, the control signal as a sum of the accumulated changes and a feedforward term. The method may include changing, by the controller, the control signal based on a normal distance from a present operating point defined by the first difference and the second difference to a sliding surface defined by the predetermined value. Implementation of the described configurations may include hardware, a method or process, or computer software on a computer-accessible medium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
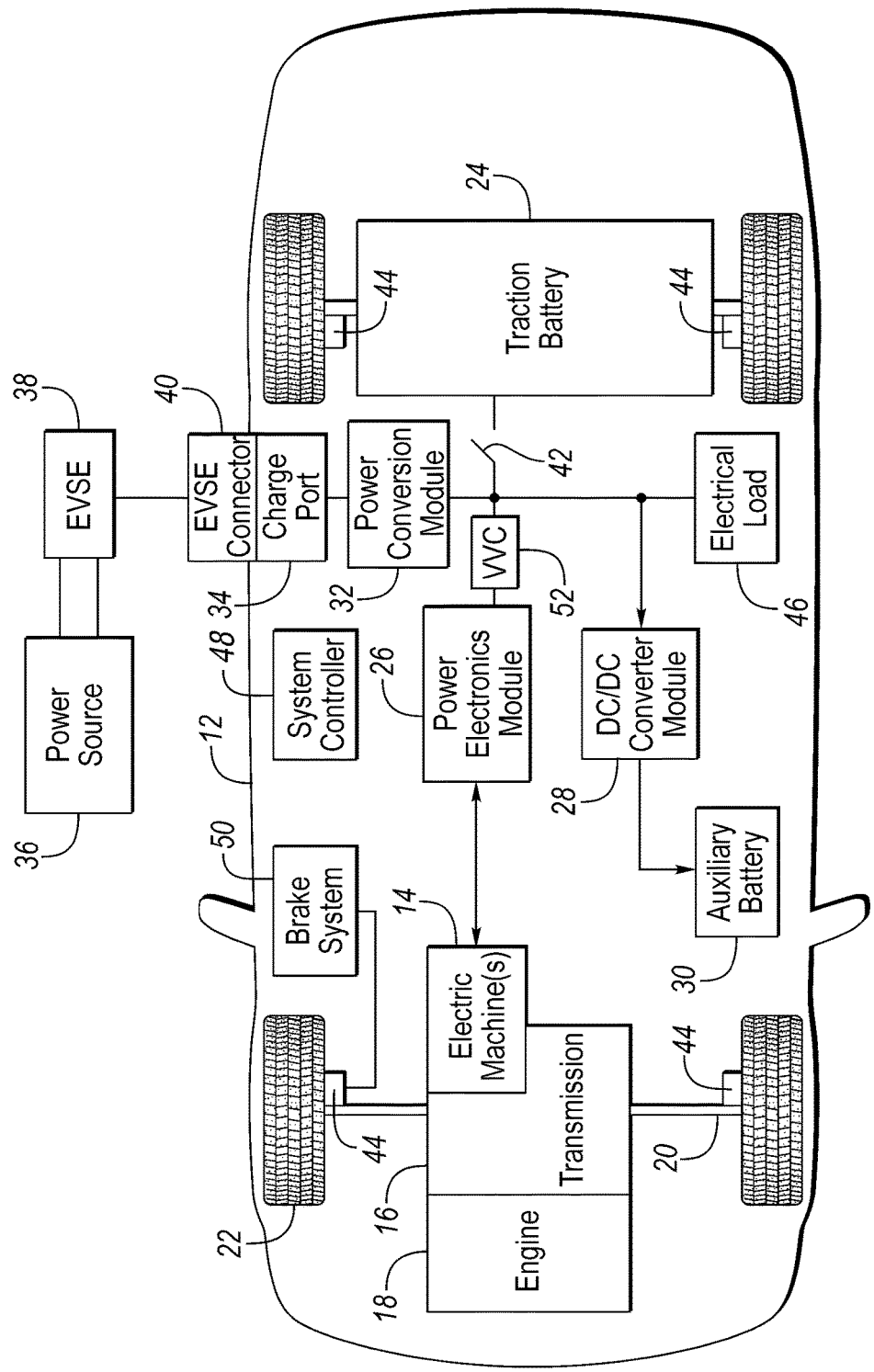
FIG. 1 is a diagram of a hybrid vehicle illustrating typical drivetrain and energy storage components.

FIG. 1 depicts an electrified vehicle 12 that is typically referred to as a plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. An electrified vehicle 12 may include a battery electric vehicle (BEV). In a BEV configuration, the engine 18 may not be present.

A traction battery or battery pack 24 stores energy that can be used by the electric machines 14. The traction battery 24 typically provides a high voltage direct current (DC) output. The traction battery 24 may be electrically coupled to one or more power electronics modules 26. One or more contactors 42 may isolate the traction battery 24 from other components when opened and connect the traction battery 24 to other components when closed. The power electronics module 26 may also be electrically coupled to the electric machines 14 and provide the ability to bi-directionally transfer energy between the traction battery 24 and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

The vehicle 12 may include a variable-voltage converter (VVC) 52 coupled between the traction battery 24 and the power electronics module 26. The VVC 52 may be a DC/DC boost converter configured to increase or boost the voltage provided by the traction battery 24. By increasing the voltage, current requirements may be decreased leading to a reduction in wiring size for the power electronics module 26 and the electric machines 14. Further, the electric machines 14 may be operated with improved efficiency and lower losses.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery) for charging the auxiliary battery 30. The low-voltage systems may be electrically coupled to the auxiliary battery 30.

The electrified vehicle 12 may be configured to recharge the traction battery 24 from an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more high-voltage loads 46 may be coupled to the high-voltage output of the traction battery 24. In some configurations, some of the high-voltage loads 46 may be coupled to the output of the VVC 52. The electrical loads 46 may include an associated controller that operates and controls the electrical loads 46 when appropriate. Examples of electrical loads 46 may be a fan, a heating element and/or an air-conditioning compressor.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

The output voltage of the VVC 52 may be controlled to achieve a desired reference voltage. Existing control strategies generally rely on linear conventional digital control based on an averaging model and small signal analysis. Global stability under large disturbances may not be preserved. The configurations described herein improve the dynamic response of the voltage regulation under large load variations.

Figure 2:
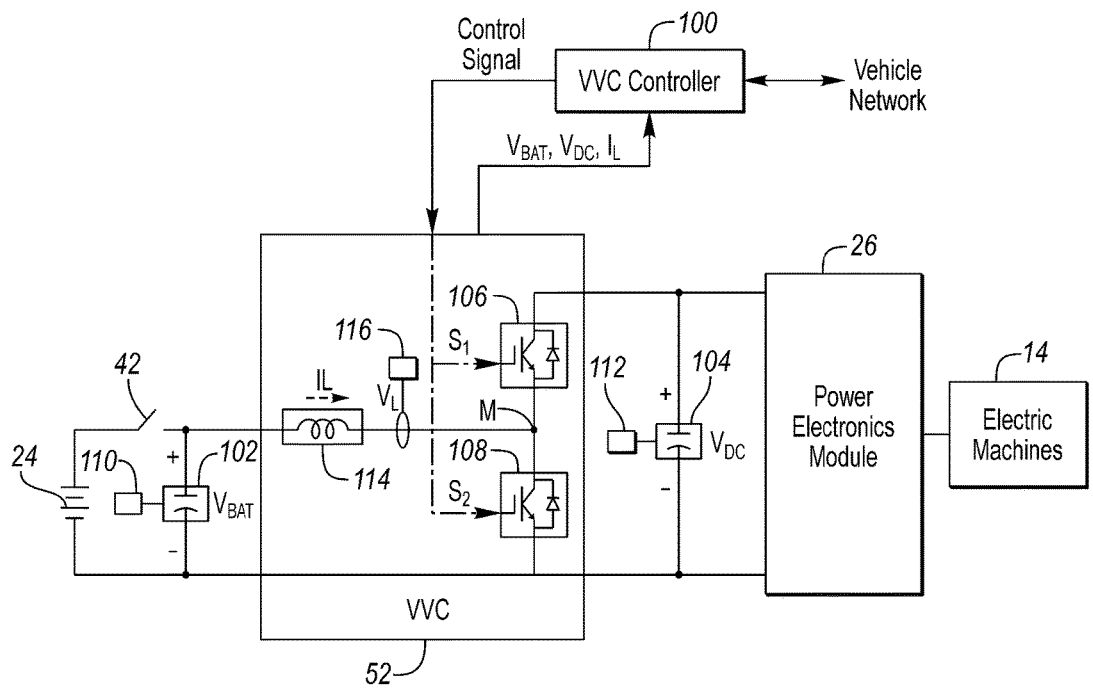
FIG. 2 is a diagram of a possible variable voltage converter configuration.

FIG. 2 depicts a diagram of a VVC 52 that is configured as a boost converter. The VVC 52 may include input terminals that may be coupled to terminals of the traction battery 24 through the contactors 42. The VVC 52 may include output terminals coupled to terminals of the power electronics module 26. Through operation of the VVC 52, a voltage at the output terminals may be greater than a voltage at the input terminals. The vehicle 12 may include a VVC controller 100 that monitors electrical parameters (e.g., voltage and current) at various locations within the VVC 52. The VVC controller 100 may determine an output voltage reference, $V^*_{dc}$. The VVC controller 100 may determine, based on the electrical parameters and the voltage reference, $V^*_{dc}$, a control signal sufficient to cause the VVC 52 to achieve the desired output voltage. In some configurations, the control signal may be implemented as a pulse-width modulated (PWM) signal in which a duty cycle of the PWM signal is varied. The VVC controller 100 may command the VVC 52 to provide the desired output voltage using the control signal. The particular control signal at which the VVC 52 is operated may be directly related to the amount of voltage boost provided by the VVC 52.

In a configuration in which the VVC controller 100 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad (1)$$

where $V_{in}$ may be the traction battery voltage.

With reference to FIG. 2, the VVC 52 may boost or "step up" the voltage potential of the electrical power provided by the traction battery 24. The traction battery 24 may provide high voltage (HV) DC power. In one or more embodiments, the traction battery 24 provides a voltage between 150 and 400 Volts. A contactor 42 may be electrically coupled in series between the traction battery 24 and the VVC 52. When the contactor 42 is closed, the HV DC power may be transferred from the traction battery 24 to the VVC 52. An input capacitor 102 may be electrically coupled in parallel to the traction battery 24. The input capacitor 102 may stabilize the bus voltage and reduce any voltage and current ripple. The VVC 52 may receive the HV DC power and boost or "step up" the voltage potential of the input voltage.

An output capacitor 104 may be electrically coupled in between the output terminals of the VVC 52. The output capacitor 104 may stabilize the bus voltage and reduce voltage and current ripple at the output of the VVC 52.

Further with reference to FIG. 2, the VVC 52 may include a first switching device 106 and a second switching device 108 for boosting an input voltage to provide the boosted output voltage. Each switching device 106, 108 may be individually controlled by a gate drive circuit (not shown) of the VVC controller 100 and may include any type of controllable switch (e.g., an insulated gate bipolar transistor (IGBT) or field-effect transistor (FET)). The gate drive circuit may provide switching signal to each switching device 106, 108 that are based on the control signal (e.g., duty cycle of PWM control signal). A diode may be coupled across each of the switching devices 106, 108.

The vehicle system may include sensors for measuring electrical parameters of the VVC 52. A first voltage sensor 110 may be configured to measure the input voltage, (e.g., voltage of the battery 24), and provide a corresponding input signal ($V_{bat}$) to the VVC controller 100. In one or more embodiments, the first voltage sensor 110 may measure the voltage across the input capacitor 102, which corresponds to the battery voltage. A second voltage sensor 112 may measure the output voltage of the VVC 52 and provide a corresponding input signal ($V_{dc}$) to the VVC controller 100. In one or more embodiments, the second voltage sensor 112 may measure the voltage across the output capacitor 104, which corresponds to the DC bus voltage. The first voltage sensor 110 and the second voltage sensor 112 may include circuitry to scale the voltages to a level appropriate for the VVC controller 100. The VVC controller 100 may include circuitry to filter and digitize the signals from the first voltage sensor 110 and the second voltage sensor 112.

An input inductor 114 may be electrically coupled in series between the traction battery 24 and the switching devices 106, 108. The input inductor 114 may alternate between storing and releasing energy in the VVC 52 to enable the providing of the variable voltages and currents as VVC 52 output, and the achieving of the desired voltage boost. A current sensor 116 may measure the input current through the input inductor 114 and provide a corresponding input signal ($I_L$) to the VVC controller 100. The input current through the input inductor 114 may be a result of the voltage difference between the input and the output voltage of the VVC 52, the conducting time of the switching devices 106, 108, and the inductance L of the input inductor 114. The VVC controller 100 may include circuitry to scale, filter, and digitize the signal from the current sensor 116.

The VVC controller 100 may be programmed to control the output voltage of the VVC 52. The VVC controller 100 may receive input from the VVC 52 and other controllers via the vehicle network, and determine the control signal. The VVC controller 100 may monitor the input signals ($V_{bat}$, $V_{dc}$, $I_L$, $V^*_{dc}$) to determine the control signal. For example, the VVC controller 100 may provide control signals to the gate drive circuit that correspond to a duty cycle command.

The gate drive circuit may then control each switching device 106, 108 based on the duty cycle command.

While equation (1) gives the general relationship between the input voltage and output voltage of the VVC 52 as a function of the duty cycle, various factors may affect the performance. For example, the voltage of the traction battery 24 may change during operation due to load variations of the electrical loads 46 coupled to the traction battery 24. Other factors may include power draw from the loads coupled to the output of the VVC 52. In these cases, it is beneficial to adjust the control signal to achieve the target voltage at the output of the VVC 52.

Existing VVC control utilizes linear conventional digital control based on an averaging model and small signal analysis. Using these conventional controls, global stability of the voltage at the output of the VVC 52 during large disturbances cannot be guaranteed.

Figure 3:
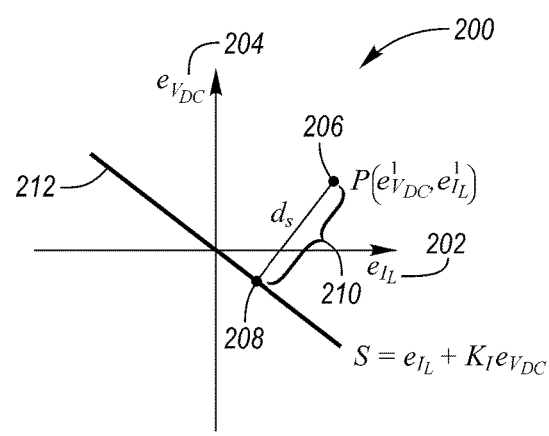
FIG. 3 is a graph depicting an operating point and a sliding surface.

To improve the performance during large transients, a sliding mode control using fuzzy logic rules may be implemented. A sliding surface based on an the inductor current and the DC bus voltage may be defined as the following:

$$S = (i^*_L - i_L) + K_1(v^*_{DC} - v_{DC}) \qquad (2)$$

where i is a desired inductor current, $v^*_{DC}$ is a desired VVC output voltage, $K_1$ is a sliding coefficient that determines the error dynamic response, $i_L$ is the actual inductor current, and $v_{DC}$ is the actual VVC output voltage. FIG. 3 depicts a plot 200 of the sliding surface 212 in coordinates defined by a current error 202 and a voltage error 204. The term $(i^*_L - i_L)$ defines the value for the current error 202, $e_{iL}$, in the inductor current from a desired reference current. The term $(v^*_{DC} - v_{DC})$ defines the value of the voltage error 204, $e_{Vdc}$, in the DC bus voltage from a desired DC bus voltage reference.

The sliding coefficient, $K_1$, may define the error dynamic response and defines the slope of the sliding surface 212 in the coordinate space defined by the current error 202 and the voltage error 204. The sliding surface 212 may be represented by a line. The sliding coefficient may be selected such that desired performance and stability are achieved. When the operating point is on the sliding surface 212, the system may achieve stable operation. Note that the operating point is on the sliding surface if S from equation (2) is equal to zero.

A distance 210, $d_s$, between the present trajectory error 206 and the sliding surface 212, S, may be defined as:

$$d_s = \frac{(i^*_L - i_L) + K_1(v^*_{DC} - v_{DC})}{\sqrt{1 + K_1^2}} \qquad (3)$$

The distance 210, $d_s$, may be defined as the normal distance between the error defined at the present trajectory error point 206, $P(V_{dc}, i_L)$, and the sliding surface 212, S. The distance 210 may be the length of a path from the trajectory error point 206 to a sliding surface point 208 such that that the path is perpendicular to the sliding surface 212. This distance 210 from any trajectory error point 206 to the line representing the sliding surface 212 may be obtained by standard mathematical operations to obtain the result of equation (3).

A goal of the control logic may be to cause the voltage output of the VVC 52 and the inductor current of the VVC 52 to operate along the sliding surface 212. The control signal may be generated based on the distance 210 to the sliding surface 212. To be on the sliding surface 212, the term $(i^*_L - i_L)$ must be equal to the term $-K_1(v^*_{DC} - v_{DC})$. Stated another way, the VVC 52 may be operating on the sliding surface 212 when the ratio of the current error to the voltage error is at a predetermined value $(-K_1)$. The VVC controller 100 may be programmed to generate the control signal (e.g., duty cycle) to force the operating point of the VVC 52 to the sliding surface 212.

Figure 4:
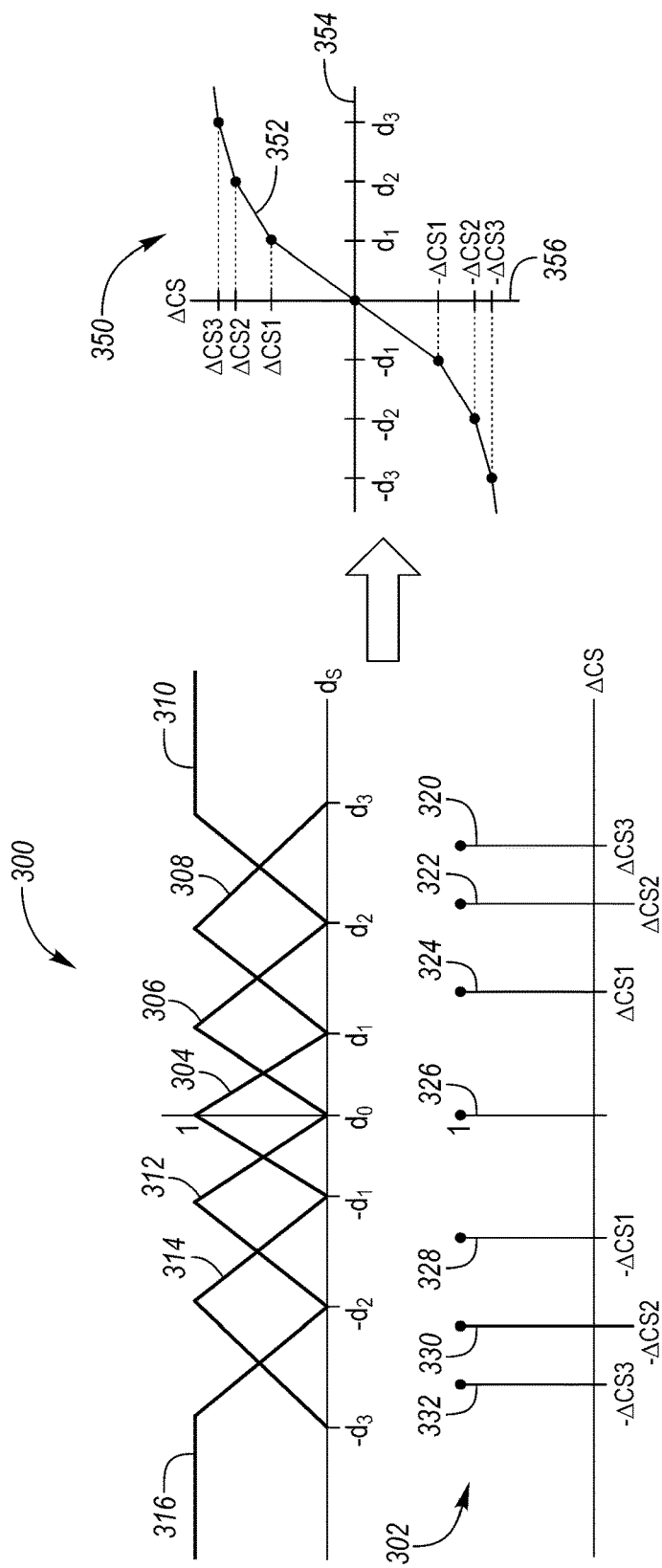
FIG. 4 depicts an example set of fuzzy membership and output membership functions and conversion to an equivalent graphical function.

The distance 210, $d_s$, may be input to a set of fuzzy logic rules to determine a change in the control signal. FIG. 4 depicts possible fuzzy membership function set 300 and a possible output mapping function set 302 for a VVC control system. The distance, $d_s$, may be defined as being in one or more classes or categories. The distance may be classified into one or more classes defined in general terms as near zero ($d_0$), small positive ($d_1$), medium positive ($d_2$), large positive ($d_3$), small negative ($-d_1$), medium negative ($-d_2$) and large negative ($-d_3$).

Classification of the distances may be accomplished based on a series of membership functions (304-316) associated with each of the classes. Each of the membership functions (304-316) defines the certainty or probability with which a particular distance belongs in the associated membership class. The membership functions (304-316) may be defined with a peak value of one that indicates that the distance certainly belongs in that class. The membership functions (304-316) may be defined as triangular, trapezoidal, Gaussian, or other shapes without limitation. The membership functions (304-316) may be overlapping. That is, a particular distance value may belong to more than one of the membership functions (304-316). The membership functions at extreme edges (e.g., 310 and 316) may saturate at a value of one such that distance values beyond the limits are in the membership functions at the extreme edges with certainty.

Associated with each of the membership classes may be an output membership mapping 302. The output membership functions (320-332) may define the change in control signal for each of the membership classes (304-316). For example, the output membership functions (320-332) for each class may be a singleton. The output membership functions (320-332) may be of other forms without limitation.

A near zero class having a first membership function 304 centered about a distance of zero, may be defined when the distance is small in a range about zero. A small positive class having a second membership function 306 centered about distance $d_1$ may be defined for small positive distance values. A medium positive class having a third membership function 308 centered about distance $d_2$ may be defined for medium positive distances. A large positive class having a fourth membership function 310 that peaks and holds at distance $d_3$ may be defined for large positive distances. The membership functions may or may not be symmetric about zero. A small negative class having a fifth membership function 312 centered about distance $-d_1$ may be defined for small negative distances. A medium negative class having a sixth membership function 314 centered about distance $-d_2$ may be defined for medium negative distances. A large negative class having a seventh membership function 316 that peaks and holds at distance $-d_3$ may be defined for large negative distances. The membership functions (304-316) may be triangular.

Associated with the near zero class, a first output membership function 326 may define the output value. Associated with the small positive class, a second output membership function 324 may define the output value. Associated with the medium positive class, a third output membership function 322 may define the output value. Associated with the large positive class, a fourth output membership function 320 may define the output value. Associated with the small negative class, a fifth output membership function 328 may define the output value. Associated with the medium negative class, a sixth output membership function 330 may define the output value. Associated with the large negative class, a seventh output membership function 332 may define the output value. The output membership function may define a change in the control signal for each class. For example, the change in the control signal for the small positive class is a change of ΔCS1. The change in the control signal may be denoted by the x-axis of the output membership mapping 302.

The fuzzy controller may operate by first determining the class based on the distance to the sliding surface. The distance value may be compared with ranges defined for each of the membership functions to determine which classes overlap with the distance value. The controller may determine the probability of being in each class based on the membership functions (304-316). The probability may be a value from zero to one. Knowing the probability of being in each of the classes, the output value may be computed in a variety of ways. A center of gravity method may be used for fuzzification and defuzzification. The final output value may be obtained by summing, over all classes, the product of the probability of being in a class and the output value for the class. In the scheme depicted, the distance may be included in up to two classes.

To simplify the execution in real-time, the fuzzy control logic may be implemented as a gain table or graph 350. After constructing the class membership functions and the output membership functions, the resulting control signal for each distance value may be determined offline. The resulting graph 352 may be discretized and stored in controller memory as a lookup table or graph 350. During operation, the VVC controller 100 may determine the distance as described and determine the control signal from the lookup table indexed by the distance value. The controller 100 may interpolate between points in the lookup table to determine an output value for distance values not stored in the table.

The VVC controller 100 may be programmed to measure the DC bus voltage and the current flowing through the inductor. The VVC controller 100 may then compute the distance to the sliding surface according to equation (3). The VVC controller 100 may then input the distance value into the membership function to determine the degree of membership of the distance value in each of the classes. The VVC controller 100 may then determine the change in control signal value associated with each class. Finally, the VVC controller 100 may combine the change in control signal values to obtain a final control signal change.

Figure 5:
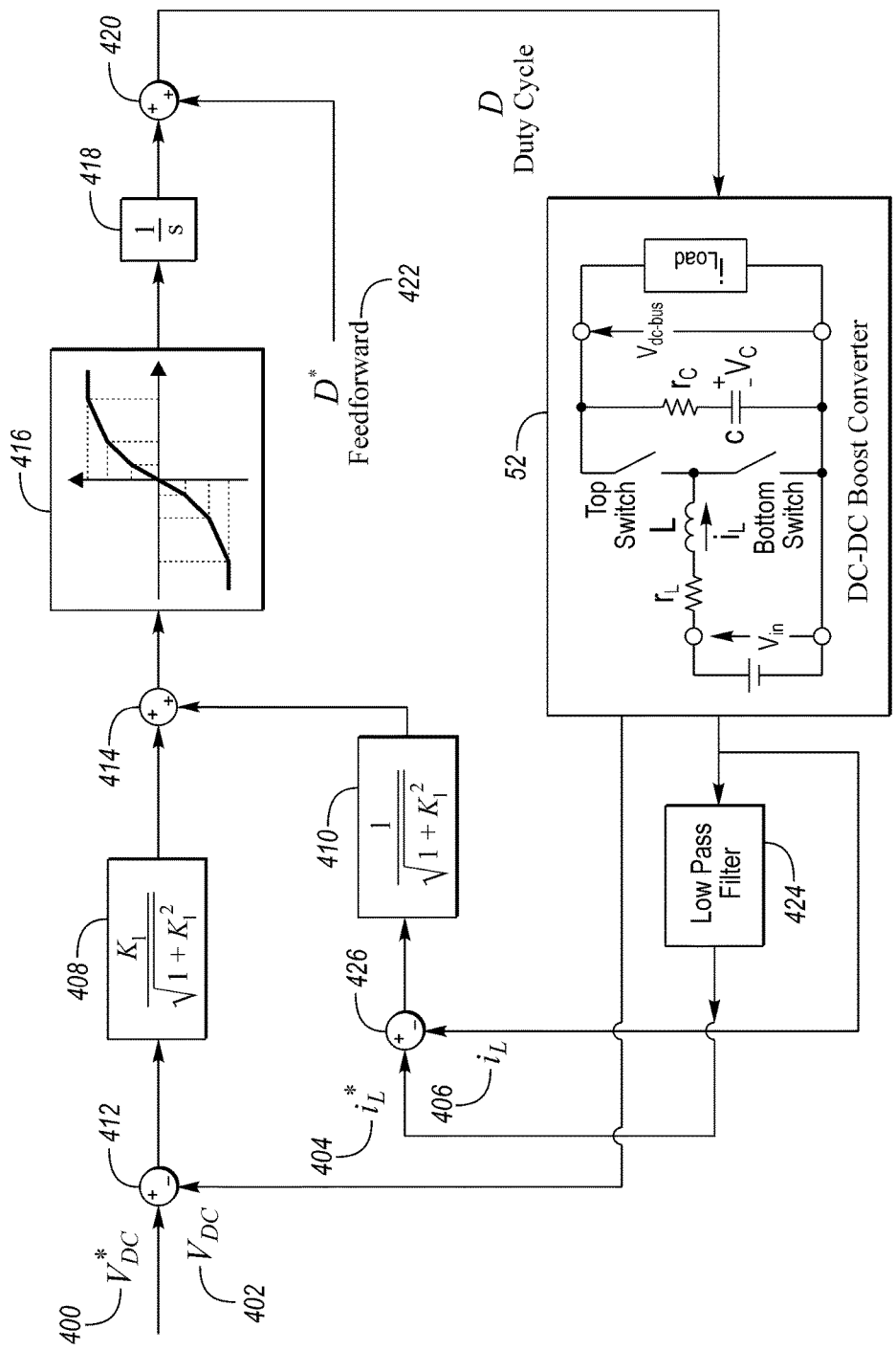
FIG. 5 depicts a block diagram of control logic that may be implemented in a controller to control the variable voltage converter.

FIG. 5 depicts a block diagram of a possible implementation of control logic for the VVC controller 100. A first difference block 412 may output a voltage error as a difference between a bus voltage reference 400 and an actual bus voltage 402. A second difference block 426 may output a current error as a difference between an inductor current reference 404 and an actual inductor current 406. The voltage error may be input to a first gain block 408. The current error may be input to a second gain block 410. A summing block 414 may output a sum of the output of the first gain block 408 and the output of the second gain block 410. The output of the summing block 414 may be the distance to the sliding surface.

The output of the summing block 414 may be input to a lookup table 416 or fuzzy control logic as described. The distance value may be used to index into the lookup table to determine a change in the control signal to be output. The output of the lookup table may be input to an integration block 418 to accumulate the values over time. The output of the lookup table 416 or fuzzy controller may be a change in the control signal that drives the operating point toward the sliding surface during the next control interval.

A second summing block 420 may sum the output of the integration block 418 and a feedforward term 422. The feedforward term 422 may be a constant value or may be a result of a lookup table based on conditions such as a desired bus voltage. The feedforward term 422 may be an estimate of the control signal that generates a particular bus voltage. The feedforward term 422 provides an open-loop estimate for the desired control signal.

The output of the integration block 418 represents the closed-loop feedback portion of the control logic. When added to the feedforward term 422, the output of the integration block 418 drives the control signal to achieve the desired control effect. In this case, the output of the integration block 418 may drive the control system to achieve a predetermined ratio ($K_1$) between the current error and voltage error.

The output of the second summing block 420 may be input to the VVC 52 to control the switching devices 106, 108. In some configurations, the output of the second summing block 420 may be the duty cycle for operating the switching devices 106, 108. The switching devices 106, 108 may be operated according to the control signal to cause a change in the DC bus voltage and the current through the inductor. The operations may be executed repeatedly at predetermined intervals while the VVC 52 is in an on-state. The VVC 52 may convert the input voltage from the traction battery to the output voltage according to the control signal.

The current reference 404 may be determined by passing the actual inductor current 406 through a low pass filter 424. When the operating point strays from the sliding surface, the VVC controller 100 attempts to move the operating point back on to the sliding surface. As the current through the inductor reaches a steady state, the current error may approach zero. As the current error approaches zero, the control may be dominated by the voltage error which may drive the voltage error towards zero.

The output voltage of the VVC 52 may be impacted by changing loads in the system. Loads connected to the output of the VVC 52 may cause changes in the output voltage by drawing more current. As the load increases, the output voltage may decrease. In addition, additional loads connected to the traction battery 24 may affect the input voltage to the VVC 52. The net effect is that load variations can cause changes in the output voltage of the VVC 52. In response to these load variations that change the output voltage of the VVC 52, the VVC controller 100 may be programmed to adjust the control signal to achieve or maintain a predetermined output voltage.

The control system described may improve the performance of the VVC 52 by quickly compensating for large changes in the load that cause a voltage change. Further, run-time requirements may be minimized by converting the fuzzy control logic into a lookup table using an off-line procedure.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a DC-DC converter including an inductor and outputting a voltage based on a signal; and
    a controller programmed to generate the signal as a sum of an open-loop estimate to achieve a reference voltage and a term that drives a ratio of a first difference between a reference current and a current through the inductor to a second difference between the reference voltage and the voltage to a predetermined value.

2. The vehicle of claim 1 wherein the controller is programmed to adjust the signal based on a normal distance from a present operating point defined by the first difference and the second difference to a sliding surface defined by the predetermined value.

3. The vehicle of claim 2 wherein the predetermined value defines a dynamic response of an error in the voltage.

4. The vehicle of claim 2 wherein the controller is further programmed to adjust the signal based on a gain schedule having the normal distance as input.

5. The vehicle of claim 2 wherein the controller is further programmed to adjust the signal based on fuzzy control rules having the normal distance as input.

6. The vehicle of claim 1 wherein the controller is further programmed to drive an adjustment in the signal to zero.

7. The vehicle of claim 1 wherein the reference current is a filtered version of the current through the inductor.

8. A DC-DC converter comprising:
    an inductor;
    at least one switching device controlled by a duty cycle; and
    a controller programmed to output the duty cycle as a sum of an open-loop estimate to achieve a reference voltage and a term that drives a ratio of a first difference between a reference current and a current through the inductor to a second difference between the reference voltage and an output voltage to a predetermined value.

9. The DC-DC converter of claim 8 wherein the controller is programmed to adjust the duty cycle based on a normal distance from a present operating point defined by the first difference and the second difference to a sliding surface defined by the predetermined value.

10. The DC-DC converter of claim 9 wherein the controller is further programmed to adjust the duty cycle based on a gain schedule having the normal distance as input.

11. The DC-DC converter of claim 9 wherein the controller is further programmed to adjust the duty cycle based on fuzzy control rules having the normal distance as input.

12. The DC-DC converter of claim 8 wherein the reference current is a low-pass filtered version of the current through the inductor.

13. A method for controlling a DC-DC converter comprising:
    estimating, by a controller, an open-loop value for a control signal for the DC-DC converter to achieve a reference voltage;
    changing, by the controller, the control signal to achieve a predetermined value for a ratio of a first difference between a reference current and a current through an inductor to a second difference between a voltage reference and an output voltage; and
    converting, by the DC-DC converter, an input voltage to the output voltage according to the control signal.

14. The method of claim 13 wherein the control signal is a duty cycle for a switching device of the DC-DC converter.

15. The method of claim 13 further comprising filtering, by the controller, the current through the inductor to generate the reference current.

16. The method of claim 13 further comprising accumulating, by the controller, changes in the control signal over a plurality of execution intervals.

17. The method of claim 13 further comprising changing, by the controller, the control signal based on a normal distance from a present operating point defined by the first difference and the second difference to a sliding surface defined by the predetermined value.

* * * * *